United States Patent [19]

Kaji

[11] 4,343,187
[45] Aug. 10, 1982

[54] SENSOR WITH INNER PROTECTIVE CHAMBER

[75] Inventor: Kiyokane Kaji, Toyota, Japan

[73] Assignee: Toyota Jidosha Kogyo Kabushiki Kaisha, Aichi, Japan

[21] Appl. No.: 162,101

[22] Filed: Jun. 23, 1980

[30] Foreign Application Priority Data

Aug. 15, 1979 [JP] Japan .................... 54-104300
Aug. 15, 1979 [JP] Japan .................... 54-104301

[51] Int. Cl.³ .................................. G01L 23/22
[52] U.S. Cl. ........................... 73/654; 73/35; 174/52 H
[58] Field of Search ............... 73/35, 649, 652, 658, 73/654, 660; 310/348, 354, 328, 329, 330; 174/50, 52, 52 H, 52 S

[56] References Cited

U.S. PATENT DOCUMENTS

| | | | |
|---|---|---|---|
| 2,826,706 | 3/1958 | Sackett | 73/654 |
| 3,633,053 | 1/1972 | Peters | 73/654 |
| 4,096,735 | 6/1978 | Huntzinger et al. | 73/35 |

*Primary Examiner*—James J. Gill
*Attorney, Agent, or Firm*—Birch, Stewart, Kolasch & Birch

[57] ABSTRACT

A sensor for sensing a property of a body, such as vibration or knocking of an internal combustion engine. The sensor includes an outer hollow tubular sensor casing, one end of which is open and the other end of which is closed and is provided on its outside with a protuberance adapted for connection to the body; an end closing member which closes the open end of the tubular sensor casing, and which is fixedly mounted to it; a sensor element for producing an electrical output signal, mounted within the tubular sensor casing; a sensor element side protective member, passing all around the sensor element between it and the inner wall of the tubular sensor casing; a sensor element base end protective member, between the sensor element and the second closed end of the tubular sensor casing; the sensor element side protective member and the sensor element base end protective member being coupled together so as to form an assembly receiving the sensor element in a substantially closed chamber; and an electrically conducting sensor lead structure, connected by one of its ends to the sensor element, for receiving a sensor output electrical signal from it, and passing through an aperture in the end closing member to the outside of the sensor.

20 Claims, 9 Drawing Figures

SENSOR WITH INNER PROTECTIVE CHAMBER

BACKGROUND OF THE INVENTION

The present invention relates to the field of sensors for converting various physical quantities into electrical signals, and more particularly relates to a particular construction for such a sensor.

In the prior art, many known sensors have been constructed for sensing various physical quantities such as temperature, pressure, vibration, and the like, for automatic control and measurement in various mechanical devices, such as, for example, automobiles, and these sensor elements are generally contained in enclosed spaces within protective casings made of metal or plastic, so as to prevent ingress of moisture, oil, dust, or other undesirable pollutants thereinto. However, the problem of ingress of oil, dust, moisture, or the like into such sensors is still not completely solved, especially if it is required to produce the sensor fairly cheaply, and to make it compact.

In particular, a sensor which is to be attached to an automobile engine is subject to very severe conditions, such as change of temperature, vibration, attack of oil, water, mud, dust, noxious gases, and the like. Therefore, the casing of such a sensor to be attached to an automobile engine must be particularly sealed against such environmental hazards.

Further, since such sensors produce electrical output signals which indicate the value of the physical quantity which they are measuring, electrically conducting lead wires must be connected to their sensor elements for transmitting the output electrical signals generated in these sensor elements. Most small size sensors are generally provided with a screw thread upon their outer cicumference, for mounting to the body of which a condition is required to be sensed. Such a form of screw attachment for a sensor is simple and convenient, and has the advantage that no special tool is required to mount the sensor to the body, but a disadvantage is present therein, in that, since the sensor casing needs to be rotated in order to screw it properly into the threaded hole in the body whose condition is required to be sensed, these electrical lead wires leading from the sensor casing will become twisted, and may be broken or tangled, and may exert force upon the sensor element mounted within the sensor casing, thereby disturbing the characteristics and the reliability of the sensor element and reducing the life of the sensor.

Further, in the particular case of the construction of a sensor element which senses vibration in a solid body, such as detonation, knocking, or pinging in an automobile internal combustion engine, and which is attached thereto by an attaching portion such as a screwed portion, problems have arisen with respect to the provision of a cheap and simple, yet reliable, construction arrangement for such a sensor, which can provide a sensor of long life and durability, and yet which is not extremely expensive or troublesome to manufacture, and which is not unduly bulky or weighty.

Further, especially in the case of a vibration sensor to be used on an automobile engine, the provision of electrical connections for electrical lead wires to be connected to the sensor element has sometimes been prone to poor contacting and other malfunctions, or to entry, over a long period of time, of water, dust, oil, or other contaminants into the connecting portions between said lead wires and the sensor.

SUMMARY OF THE INVENTION

Therefore, an object of the present invention is to provide a construction for a sensor wherein the sensor element of the sensor is doubly enclosed in an inner sensor protective chamber, formed within the outer sensor casing, so as reliably and positively to assure the operation of the sensor element, without interference, over a long service life of the sensor.

A further object of the present invention is to provide a sensor which has plug-in connecting terminals, so that, when installing the sensor by screwing it to an object such as an automobile internal combustion engine, it should not occur that the lead wires to the sensor should become twisted by the rotation of the sensor casing, whereby they might become tangled or broken, or whereby a force might be undesirably exerted on the sensor element via these lead wires.

A further object of the present invention is to provide a sensor which has an improved packaging structure for the sensor element thereof, in order to eliminate the abovementioned shortcomings of conventional sensors.

According to the present invention, these objects, and others, are attained by a sensor for sensing a property of a body, comprising: an outer hollow tubular sensor casing, a first end of which is open and a second end of which is closed and is provided on its outside side with a protuberance adapted for connection to the body; an end closing member which closes the first open end of the outer hollow tubular sensor casing, and is fixedly mounted thereto; a sensor element for producing an electrical output signal, mounted within the outer hollow tubular sensor casing; a sensor element side protective member, passing all around the sensor element between it and the inner wall of the outer hollow tubular sensor casing; a sensor element base end protective member, between the sensor element and the second closed end of the outer hollow tubular sensor casing; the sensor element side protective member and the sensor element base end protective member being coupled together so as to form a assembly receiving the sensor element in a substantially closed chamber; and an electrically conducting sensor lead structure, connected at its one end to the sensor element for receiving a sensor output electrical signal therefrom, and passing through an aperture in the end closing member to the outside of the sensor.

According to such a construction, since the sensor element is additionally protected by the substantially closed sensor element protective chamber in addition to the protection therefor provided by the outer hollow tubular sensor casing, a double or fail safe protection is provided for this sensor element against the ingress of dust, dirt, oil, gases, moisture, or other undesirable contaminants which could shorten its life or deteriorate its performance.

BRIEF DESCRIPTION OF THE DRAWINGS

The present invention will become more fully understood from the following description of some preferred embodiments thereof, which is to be taken in conjunction with the accompanying drawings. It should be clearly understood, however, that the description of the embodiments, and the drawings, are all of them provided purely for the purposes of illustration and exemplification only, and are in no way to be taken as limitative of the scope of the present invention. Although in the following description of the preferred embodiments various expressions such as "top", "bottom", "left", "right", "upper", "lower", etc., will be used for the convenience of description, with reference to the particular orientation of the embodiments as shown in the drawings, these expressions are not intended to be limitative of the present invention, but merely to be indicative of mutual spatial relation of the elements of the sensor, in relation to the particular orientations shown in the drawings in which a screwed protuberance of each of the embodiments is shown as being at the bottom. In the drawings.

DESCRIPTION OF THE PREFERRED EMBODIMENTS

The present invention will now be described with reference to a number of preferred embodiments.

Figure 1:
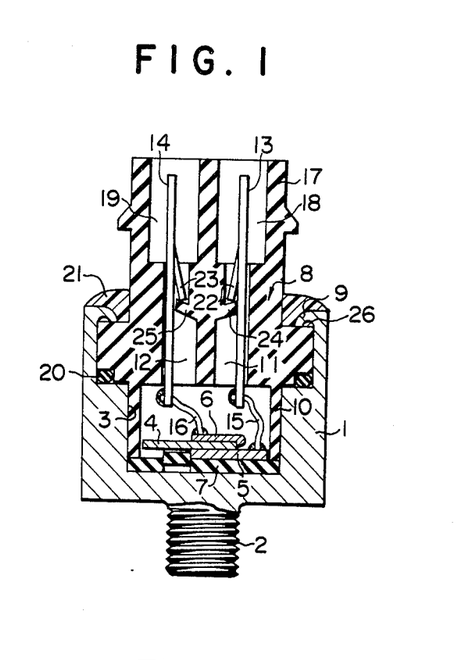
FIG. 1 is a part sectional view taken along the longitudinal axis of a sensor which is a first embodiment of the present invention, the end of a sensor element protective chamber, in this embodiment, remote from a screwed mounting protuberance of the sensor being closed by an end closing member of the sensor.
Figure 2:
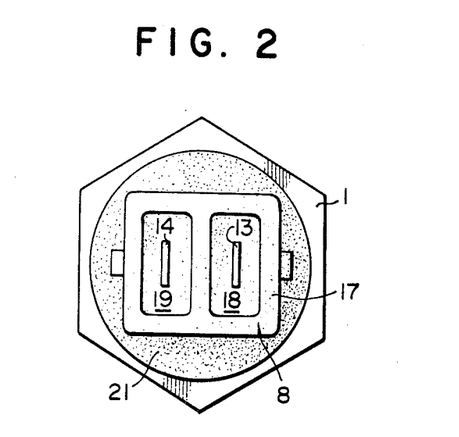
FIG. 2 is a plan view of the sensor according to the first embodiment of the present invention shown in FIG. 1, showing the outer hexagonal shape of the tubular casing thereof.

FIG. 1 is a part sectional view taken along the longitudinal axis of a first preferred embodiment of the sensor according to the present invention. This sensor element is constructed with an outer hollow tubular sensor casing 1 which is generally formed as a hollow tubular element. The inside of the casing 1 is formed as a stepped cylinder, and the bottom of the casing 1 is closed and is provided on its outside with a screwed attachment protuberance 2 suitably adapted, in this embodiment by a screw thread being formed thereon, for attachment to a body (not shown) a property of which, such as vibration, is required to be sensed. This body may be, for example, an internal combustion engine, a sensor according to the present invention being particularly designed for detecting knocking or pinging in such an internal combustion engine. The outer surface of the tubular sensor casing 1 is formed in a hexagonal shape, as best seen in FIG. 2, for providing an easy shape for tightly gripping the sensor as a whole in order firmly to screw the screwed attachment protuberance 2 into the body whose condition is to be sensed.

Within the inner axial cavity 3 of the tubular sensor casing 1 there is received a sensor element 4, which is generally plate like in shape. This sensor element 4 is made of a piezoelectric ceramic such as $BaTiO_3$, and on opposite sides of this sensor element 4 there are attached a first electrically conducting contact plate 5 and a second electrically conducting contact plate 6, for picking up electrical signals from the sensor element 4 produced by the bending thereof caused by vibration, in a per se well known way. The first contact plate 5 is mounted to the side of an insulating sensor base mounting plate 7 remote from the screwed attachment protuberance 2, in such a manner that the sensor element 4 projects after the fashion of a cantilever.

The upper opening of the outer hollow tubular sensor casing 1 is closed by an end closing cap member 8 made of a plastic material or the like, the outer cylindrical lower surface of which is engaged within the upper cylindrical inner surface of the tubular sensor casing 1. In this embodiment, the lower end of the cap member 8 is engaged with the aforesaid step formed on the inner cylindrical surface of the casing 1, and from this lower end of the cap member 8 there protrudes a ring shaped bracing member 10 which surrounds the sensor element 4, the first electrically conducting contact plate 5, and the second electrically conducting contact plate 6. The lower end in the drawing of the ring shaped bracing member 10 abuts closely against the upper side of the insulating sensor base mounting plate 7 so as to clamp the plate 7 against the lower wall of the sensor casing 1, on the other side of which is provided the screwed attachment protuberance 2. The end closing cap member 8 is fixed within the inner cylindrical surface of the tubular sensor casing 1 by the open upper end edge portion 9 of the casing 1 being bent over against a step formed on the end closing cap member 8 and crimped thereto.

In the cap member 8 there are formed a first connector hole 11 and a second connector hole 12, and in these, respectively, they are mounted a first electrical connector element 13 and a second electrical connector element 14, the upper ends of which in the drawing are shaped as male connecting members. The lower end of the first electrical connector element 13 and the lower end of the second electrical connector element 14 are, respectively, connected to the upper end of a first connecting lead wire 15 and the upper end of a second connecting lead wire 16. The lower end of the wire 15 is connected to the electrically conducting contact plate 5 so as to conduct sensor electrical output signals from the sensor element 4, while the lower end of the wire 16 is connected to the electrically conducting contact plate 6, so as, likewise, to conduct sensor electrical output signals from the sensor element 4. The upper end of the first electrical connector element 13 is received within a first connector protective cavity 18 defined by the connector protecting shell 17 of the end closing cap member 8, and, similarly, the upper end of the second electrical connector element 14 is received within a second connector protective cavity 19 defined within the connector protecting shell 17 of the end closing cap member 8. Thus, connection to the upper ends of the electrical connector elements 13 and 14 by a female plug element (not shown) is positively assured, because the connector protecting shell 17 will protect such a connection from intrusion of dust, dirt, oil, moisture, or the like, even after a long period of use of the sensor.

A sealing O-ring 20 is provided for sealing purposes between a step formed on the end closing cap member 8 and the aforesaid step formed on the inner cylindrical surface of the tubular sensor casing 1, against which said step formed on the cap member 8 abuts. Further, a plastic seal 21 is provided for sealing purposes around the open upper end edge portion 9 of the tubular sensor casing 1, between it and the upper portion in the drawing of the cap member 8.

The process of assembly of the vibration sensor described above according to the first preferred embodiment of the present invention will now be described.

First, one end of the first connecting lead wire 15 is soldered or otherwise connected to the first electrically conducting contact plate 5, after the contact plate 5, the sensor element 4, and the second electrically conducting contact plate 6 already have been mounted to the insulating sensor base mounting plate 7. Then, one end of the second connecting lead wire 16 is connected to the second electrically conducting contact plate 6. Subsequently, the other ends of the first connecting lead wire 15 and the second connecting lead wire 16 are soldered, respectively, to the lower ends of the first electrical connector element 13 and the second electrical connector element 14, or are fixed thereto in some other fashion, such as by crimping. Next, the upper ends of the first electrical connector element 13 and of the second electrical connector element 14, respectively, are inserted into the first connector hole 11 and the second connector hole 12 which are formed in the end closing cap member 8, and are guided into the narrow portions thereof which respectively lead to the first connector protective cavity 18 and the second connector protective cavity 19. The first electrical connector element 13 and the second electrical connector element 14 are pushed upwards into the first connector hole 11 and the second connector hole 12, respectively, from the side of the end closing cap member 8 on which is formed the ring shaped bracing member 10, and penetrate upwards so as to reach the first connector protective cavity 18 and the second connector protective cavity 19, respectively. Although it is not so shown in the drawings, the dimension perpendicular to the plane of the drawing paper in FIG. 1 of the upper parts of the electrical connector elements 13 and 14 is substantially smaller than that of the lower parts thereof, so that, when the electrical connector elements 13 and 14 have penetrated a certain distance through the narrow upper portions of the connector holes 11 and 12, they are stopped from further entering thereinto by their wider portions abutting against parts of the end closing cap member 8 not visible in the drawing. In this condition, the snap engaging claw 22 of the element 13 and the snap engaging claw 23 of the element 14 have just reached the position within the first connector hole 11 and the second connector hole 12 at which they can snap outwards and engage, respectively, with the first claw engagement lip 24 and the second claw engagement lip 25 formed on the end closing cap member 8. This snap connection is a one way or irreversible connection, and, by the coacting effect of the snap engaging claw 22 of the electrical connector element 13 and the wider lower portion of the element 13, and, similarly, by the coacting effect of the snap engaging claw 23 of the electrical connector element 14 and of the wider lower portion of the element 14, the electrical connector elements 13 and 14 are both tightly secured within the connector holes 11 and 12 without the use of any particular fixing construction other than that detailed above. In this condition, the narrow upper portions of the connector holes 11 and 12 are effectively substantially closed by the electrical connector elements 13 and 14.

Next, the lower end of the ring shaped bracing member 10 is secured to the upper side of the insulating sensor base mounting plate 7 with an adhesive. Thus, the sensor element 4, the first and second electrically conducting contact plates 5 and 6, the first and second connecting lead wires 15 and 16 are now received within a substantially closed sensor element protective chamber, the bottom of which is constituted by the insulating sensor base mounting plate 7, the side of which is constituted by the ring shaped bracing member 10, which acts in this case as a sensor element side protective member, and the upper side of which is constituted by the end closing cap member 8.

Next, the ring shaped bracing member 10 and the insulating sensor base mounting plate 7, etc., are inserted into the open end of the outer hollow tubular sensor casing 1 and pushed thereinto until the lower side of the base mounting plate 7 abuts against the bottom end of the tubular sensor casing 1, on the other side of which is provided the screwed attachment protuberance 2. Of course, before this is done, the sealing O-ring 20 is arranged properly within the tubular sensor casing 1. Then, while the end closing cap member 8 is positively tightly held in this position within the tubular sensor casing 1, the open upper end edge portion 9 is crimped over against the upper shoulder portion 26 of the cap member 8, so as to hold the cap member 8 firmly within the tubular sensor casing 1, and, further, so as to clamp the insulating sensor base mounting plate 7 tightly between the lower end of the ring shaped bracing member 10 and the upper side of the bottom end of the tubular sensor casing 1, so as to supplement the action of the above described adhesive and positively assure good relative immobility between the insulating sensor base mounting plate 7 and the bottom end of the ring shaped bracing member 10. Thus, the maintenance of the integrity of the above described sensor element protective chamber is positively assured. After the above described crimping over process, the plastic seal 21 is deposited around the open upper end edge portion 9 where it is crimped over to the upper shoulder portion 26 of the tubular sensor casing 1, in order to ensure a positive seal.

When this sensor is to be used, first it is screwed by its outer hexagonal shape (shown in FIG. 2) into a suitable screwed hole in a part of an internal combustion engine, or the like, vibration of which is required to be sensed, and then a suitable female connector (not shown) is clipped over the connector protecting shell 17 of the end closing cap member 8, engaging with outer projections thereon, inner female electrical connecting members thereby being connected with the electrical connector elements 13 and 14 so as to receive electrical output signals from the sensor element 4. Thereby, the connector protective cavities 18 and 19, which respectively surround the electrical connector elements 13 and 14, are received within this female connector element, and accordingly any ingress of moisture, oil, dirt, dust, or the like into the above described sensor element protective chamber containing the sensor element 4 is positively prevented.

Thus, it is seen that according to the above described sensor according to the present invention, the sensor element is contained within a substantially closed sensor element protective chamber, defined in this embodiment by the insulating sensor base mounting plate 7 and the ring shaped bracing member 10, and this substantially closed sensor element protective chamber functions as a inner chamber within the outer chamber defined by the outer hollow tubular sensor casing 1, so that the sensor element 4 is doubly protected from attack by contaminants such as moisture, oil, or the like, and accordingly the operation of the sensor element 4 is guaranteed to be maintained over a long period of use of the sensor.

Figure 3:
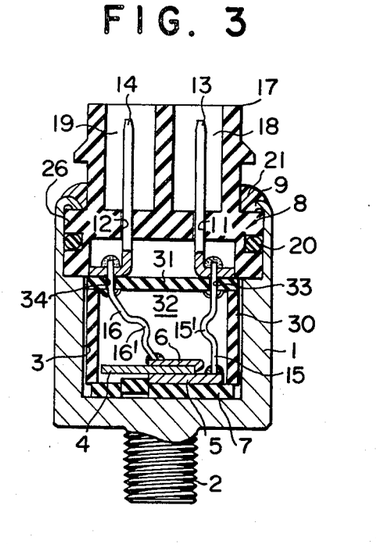
FIG. 3 is a part sectional view, similar to FIG. 1, taken along the longitudinal axis of a sensor which is a second embodiment of the present invention, in which the end of the sensor element protective chamber remote from the mounting protuberance is closed by a sensor element top end protective member.

In FIG. 3 a second embodiment of the sensor according to the present invention is shown. FIG. 3 is a part sectional view along the longitudinal axis of the sensor, in a similar fashion to FIG. 1. Parts in the second embodiment shown in FIG. 3 which correspond to parts in the first embodiment shown in FIGS. 1 and 2 are designated by the same reference numerals.

In this embodiment, the sensor element side protective member is not formed integrally with the end closing member which closes the upper open end of the outer hollow tubular sensor casing, as was the case in the first embodiment. Instead, the sensor element side protective member is constituted as a bracing tubular ring member 30, which is a ring like cylinder open at both of its ends. The lower end of the ring member 30 abuts to the upper side in the drawing of the insulating sensor base mounting plate 7. The upper end of the bracing tubular ring member 30 abuts to the lower side of a sensor element upper protecting plate 31. The insulating sensor base mounting plate 7 is connected to the lower end of the bracing tubular ring member 30, and the sensor element upper protecting plate 31 is connected to the upper end of the ring member 30, by adhesive. Thus, by their cooperation, these three members define a sensor element inner protective chamber 32 containing the sensor element 4. The end closing cap member 8 is secured within the tubular sensor casing 1, in a similar way to that practiced in the first embodiment of FIGS. 1 and 2, by the lower side of the end closing cap member 8 being engaged to a step formed in the inner cylindrical surface of the tubular sensor casing 1, while the upper shoulder portion 26 of the cap member 8 is engaged with an open upper end edge portion 9 at the upper end of the tubular sensor casing 1. In the same way as before, a plastic seal 21 is provided so as to seal the connection between the open upper end edge portion 9 and the upper shoulder portion 26 of the cap member 8. The lower end of the cap member 8, which abuts said step formed on the inner cylindrical surface of the tubular sensor casing 1, also abuts the upper face of the sensor element upper protecting plate 31, and thereby clamps the plate 31 against the bracing tubular ring member 30, and the ring member 30 against the insulating sensor base mounting plate 7, and the plate 7 against the upper side of the bottom of the tubular sensor casing 1, on the other side of which is formed the screwed attachment protuberance 2. Thereby, the integrity of the sensor element inner protective chamber 32 is positively assured, by this clamping process, thus supplementing the above described action of the adhesive connecting the sensor element upper protecting plate 31 to the bracing tubular ring member 30 and the ring member 30 to the insulating sensor base mounting plate 7.

The connecting lead wires 15 and 16 are led out, respectively, through first and second protecting plate apertures 33 and 34 provided in the sensor element upper protecting plate 31, and then are attached to the lower ends, respectively, of the electrical connector elements 13 and 14. These lower ends of the elements 13 and 14 are connected to the upper side of the plate 31, using adhesive or fastening screws not shown in the drawing. In this embodiment, therefore, the provision of clip portions such as the snap engaging claws 22 and 23 of the embodiment shown in FIGS. 1 and 2 is not required.

According to the abovementioned construction, any force exerted on the electrical connector elements 13 and 14, when a female connector is connected to the upper part of the sensor, will be supported by the sensor element upper protecting plate 31, and accordingly such a force will not be transmitted to the sensor element 4 through the connecting lead wire 15 or 16. In the embodiment of FIG. 3, the connecting lead wires 15 and 16 are formed, respectively, with kinked portions 15' and 16' therein, which are formed in U-shapes, so as to prevent force being transmitted to the sensor element 4 through the connecting lead wire 15 or 16.

Now the process of assembly of the sensor element according to the second embodiment of the present invention shown in FIG. 3 will be described.

First the sensor element 4 is mounted on the insulating sensor base mounting plate 7 along with the electrically conducting contact plate 5 and 6. Then one end of the connecting lead wire 15 is soldered to the electrically conducting contact plate 5, and one end of the connecting lead wire 16 is soldered to the electrically conducting contact plate 6. Then, the bracing tubular ring member 30 is placed around the sensor element 4, the electrically conducting contact plates 5 and 6, and its lower end is abutted to the insulating sensor base mounting plate 7 and is attached thereto by an adhesive, or the like. Then the sensor element upper protecting plate 31 is assembled to this combination, and the upper ends of the connecting lead wires 15 and 16, respectively, are passed through the apertures 33 and 34 formed in this sensor element upper protecting plate 31, and the plate 31 is secured to the upper end of the bracing tubular ring member 30, using an adhesive or the like. At this time, said upper ends of the connecting lead wires 15 and 16 are pulled out a little from the apertures 33 and 34, but not so much so as to straighten the kinked portion 15' or 16'. These upper ends of the connecting lead wires 15 and 16 are then soldered to the lower ends of the electrical connector elements 13 and 14. Then the lower ends of the electrical connector elements 13 and 14 are secured, as mentioned above, to the upper face in the drawing of the plate 31, by adhesive, fixing screws, or the like. Then the assembly above described is inserted into the open end of the tubular sensor casing 1, and is pushed thereinto until the lower side of the insulating sensor base mounting plate 7 abuts to the bottom of the tubular sensor casing 1, on the other side of which is formed the screwed attachment protuberance 2.

While the above described assembly is maintained in this position, the end closing cap member 8 is assembled on to the open end of the tubular sensor casing 1, with the sealing O-ring 20 already fitted into a circumferential groove thereon. The cap member 8 is fitted to this assembly, with the electrical connector elements 13 and 14 passing respectively into the connector holes 11 and 12 of the cap member 8, and the lower end of the cap member 8 is abutted against the upper side of the plate 31, and also against the upper side of the step formed in the inner cylindrical surface of the tubular sensor casing 1.

With the cap member 8 tightly held in this position, the open upper end edge portion 9 is then crimped over against the upper shoulder portion 26 formed on the cap member 8, so as to hold the cap member 8 firmly in this position. Then the plastic seal 21 is deposited around the joining area between the open upper end edge portion 9 and the cap member 8, so as positively to seal this combination against the ingress of water, oil, dirt, dust, or any other contaminant. Thus, the upper ends of the electrical connector elements 13 and 14, respectively, project into the connector protective cavities 18 and 19, which are surrounded by the connector protecting shell 17 of the cap member 8. According to this above described construction, the sensor element 4 is doubly enclosed, both within an outer casing formed by the outer hollow tubular sensor casing 1 and the end closing cap member 8, and within the sensor element inner protective chamber 32, formed by the sensor element upper protecting plate 31, the bracing tubular ring member 30, and the insulating sensor base mounting plate 7. Accordingly, this sensor element 4 is positively protected from intrusion of moisture, dirt, oil, dust, or the like, and accordingly its operation is effectively guaranteed for a long period of service of the sensor.

Figure 4:
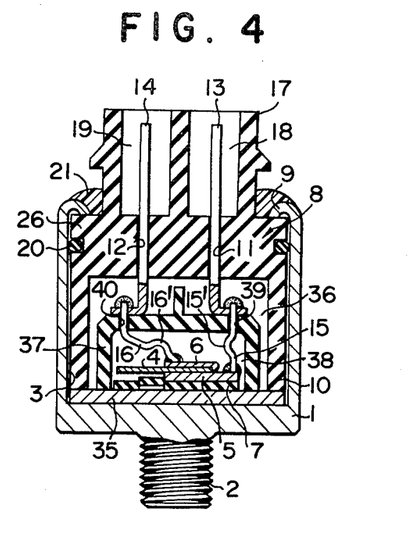
FIG. 4 is a part sectional view, similar to FIGS. 1 and 3, taken along the longitudinal axis of a sensor which is a third embodiment of the present invention, in which the sensor element top end protective member of the second embodiment shown in FIG. 3 is formed integrally with the sensor element side protective member.

In FIG. 4, there is shown a third embodiment of the sensor according to the present invention, in a longitudinal sectional view, similar to the views given in FIGS. 1 and 3 of the first and second embodiments. In this figure, parts which correspond to parts in the other embodiments are designated by the same reference numerals as in the figures showing those other embodiments. In this sensor, the insulating sensor base mounting plate 7, on which are mounted the sensor element 4, the first electrically conducting contact plate 5, and the second electrically conducting contact plate 6, in a fashion similar to that in the first and second embodiments described above, is attached by adhesive or the like onto a metallic sensor base mounting plate 35. Also, to this metallic sensor base mounting plate 35, around the assembly comprising the insulating sensor base mounting plate 7, the sensor element 4, etc., there is attached, by adhesive or the like, the lower circumferential edge of a inner sensor protective cover 37, which is formed like a cap, and surrounds the sensor element 4, the first electrically conducting contact plate 5, and the second electrically conducting contact plate 6, defining a sensor element inner protective chamber 38 containing these elements. The inner sensor protective cover 37 is pierced with a first cap aperture 39 and a second cap aperture 40, for passing, respectively, the first connecting lead wire 15 and the second connecting lead wire 16. Again, in this embodiment, the first and second connecting lead wires 15 and 16 are formed with first and second kinked portions 15' and 16', respectively.

To the upper side of the upper end of the inner sensor protective cover 37, there are attached, by adhesive, securing bolts, or the like, the lower ends of the electrical connector elements 13 and 14, which are soldered, respectively, to the upper ends of the connecting lead wires 15 and 16. This construction of attaching the lower ends of the electrical connector elements 13 and 14 to the upper side of the inner sensor protective cover 37 is analogous to the construction of the second embodiment shown in FIG. 3.

The electrical connector elements 13 and 14, respectively, are passed through connector holes 11 and 12 formed in the cap member 8. The cap member 8 is formed with a ring shaped bracing member 10, which, in a manner rather analogous to the first embodiment shown in FIGS. 1 and 2, projects downward and is abutted to the upper face of the metallic sensor base mounting plate 35, the lower face of which is in contact with the bottom of the tubular sensor casing 1, on the other side of which is formed the screwed attachment protuberance 2. Around the cap member 8, in a circumferential groove, there is provided the sealing O-ring 20, and the cap member 8 is securely held within the tubular sensor casing 1, as before, by the open upper end edge portion 9 being crimped over against its upper shoulder portion 26. Again, a plastic seal 21 is provided for sealing the connection between the open upper end edge portion 9 and the cap member 8. Similarly, as in the other embodiments, the projecting upper male portions of the electrical connector elements 13 and 14 project, respectively, into connector protective cavities 18 and 19 which are surrounded by a connector protecting shell 17 formed as an upper projecting portion of the cap member 8.

In this embodiment the sensor element 4 is in fact triply protected. That is to say, the sensor element 4 is received within the sensor element inner protective chamber 38, defined by the inner sensor protective cover 37, etc., and the cover 37 is received within the middle protective chamber 36 defined by the ring shaped bracing member 10, the metallic sensor base mounting plate 35, and the upper portion of the cap member 8, and again this structure is received within an outer protective chamber defined by the tubular sensor casing 1, the plastic seal 21, and the connector protecting shell 17 of the cap member 8. Therefore, according to this construction, the long term operation of the sensor element 4 is even better assured than was the case in the other embodiments. However, it should be noticed that, in this embodiment, part of the support of the electrical connector elements 13 and 14 is provided by the adhesive joining the inner sensor protective cover 37 to the metallic sensor base mounting plate 35, and accordingly this embodiment may not be suitable for a case in which severe forces may be put upon the electrical connector elements 13 and 14, unless this adhesive is rather strong.

The process of assembling the vibration sensor according to the third preferred embodiment of the present invention shown in FIG. 4, will now be described.

First, the assembly of the sensor element 4, the first electrically conducting contact plate 5, and the second electrically conducting contact plate 6 is mounted on the insulating sensor base mounting plate 7. Then the plate 7 is mounted to the upper face of the metallic sensor base mounting plate 35, using adhesive or the like. Then the inner sensor protective cover 37 is placed over the assembly of the plate 7, the sensor element 4, etc., and is secured to the metallic plate 35 by adhesive or the like, so as to define the sensor element inner protective chamber 38. As this is done, the upper ends of the connecting lead wires 15 and 16 are passed through the apertures 39 and 40. These ends are pulled out somewhat through these apertures, but not so much so as to straighten the kinked portion 15' or the kinked portion 16', and these ends are then soldered to the lower ends of the electrical connector elements 13 and 14, respectively. Then these lower ends of the electrical connector elements 13 and 14 are secured to the upper side of the inner sensor protective cover 37 by adhesive, securing bolts, or the like.

Next, this assembly is approached to and pushed into the inner cylindrical space within the outer hollow tubular sensor casing 1, and is abutted to the bottom of the tubular sensor casing 1, on the other side of which is provided the screwed attachment protuberance 2. That is to say, the lower side of the metallic sensor base mounting plate 35 is abutted against this closed end. While the assembly is held in this place, the cap member 8 is approached thereto, and the ring shaped bracing member 10 of the cap member 8 is inserted into the upper opening of the tubular sensor casing 1. The electrical connector elements 13 and 14 are inserted into the connector holes 11 and 12 of the cap member 8. The cap member 8 is pushed as far downwards as possible, so that the lower end of the ring member 10 abuts against the upper face of the metallic sensor base mounting plate 35, and thereby clamps the metallic plate 35 securely against the bottom end of the tubular sensor casing 1. With the cap member 8 held in this condition tightly, the open upper end edge portion 9 is crimped over against the upper shoulder portion 26 of the cap member 8, so as to hold the cap member 8 firmly in position. Then the plastic seal 21 is applied. Of course, before the cap member 8 is inserted into the tubular sensor casing 1, the sealing O-ring 20 is provided in the annular circumferential groove formed around the cap member 8.

Figure 5:
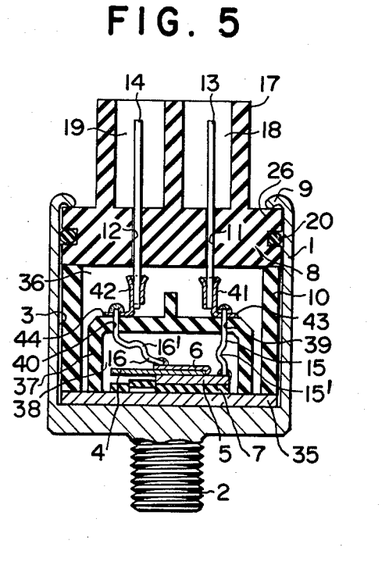
FIG. 5 is a part sectional view, similar to FIGS. 1, 3 and 4, taken along the longitudinal axis of a sensor which is a fourth embodiment of the present invention, which is broadly similar to the third embodiment shown in FIG. 4, except that the electrically conducting sensor lead structures for conducting sensor output electrical signals from the sensor element are each provided in two portions which are attached together by a detachable clip, for ease of assembly.

In FIG. 5 there is shown a fourth embodiment of the sensor according to the present invention, which is a slight modification of the third embodiment shown in FIG. 4.

In FIG. 5, parts which correspond to similar parts in the third embodiment shown in FIG. 4 are designated by the same reference numerals as in that figure. In this embodiment, the lower ends of the electrical connector elements 13 and 14 are not directly attached to the upper side of the inner sensor protective cover 37. Instead, the upper ends of the connecting lead wires 15 and 16, respectively, after passing through the apertures 39 and 40 formed in the upper side of the inner sensor protective cover 37, are soldered, respectively, to clip elements 41 and 42, which are adapted to be clipped to the lower ends of the electrical connector elements 13 and 14, respectively, and which are secured to the upper side of the upper face of the inner sensor protective cover 37, by adhesive, securing bolts, or the like, not shown.

In this embodiment, the electrical connector elements 13 and 14 need not be mounted until after the end closing cap member 8 has been secured into the tubular sensor casing 1 by the crimping over of the open upper end edge portion 9 against the upper shoulder portion 26. Instead, after the other parts of the process of the assembly of the sensor have been performed, the electrical connector elements 13 and 14 are respectively approached to and inserted into the connector protective cavities 18 and 19, which are surrounded by the connector protecting shell 17 of the cap member 8, and are inserted into the connector holes 11 and 12 and passed down thereinto, so that the lower ends of the electrical connector elements 13 and 14 clip into the clip elements 41 and 42, respectively. Accordingly, the process of the assembly of the sensor can be facilitated.

In a further possible modification of this fourth embodiment, the electrical connector elements 13 and 14 could be positively secured to the cap member 8, by securing bolts, or by an irreversible clipping structure similar to that shown in FIG. 1, but operating in the reverse direction, or the like. As an alternative, the electrical connector elements 13 and 14 could be inserted into the connector holes 11 and 12 of the cap member 8 from below, before the end closing cap member 8 is mounted to the tubular sensor casing 1, with portions of the electrical connector elements 13 and 14 which are wider in the direction perpendicular to the plane of the drawing paper in FIG. 5 abutting against corresponding portions of the cap member 8, so that, thereby, the electrical connector elements 13 and 14 would be positively held within the connector protective cavities 18 and 19 against being displaced in the upwards direction in the figure. The clip engagement of the lower portions of the electrical connector elements 13 and 14 with the clip elements 41 and 42, respectively, would still be very useful, in the event that it were required to dismantle the sensor for servicing of the sensor element 4, or the like.

In this embodiment, the ring shaped bracing member 10 is formed as a separate member from the end closing cap member 8, and is clamped between the lower face of the cap member 8 and the upper face of the metallic sensor base mounting plate 35, by the action of the open upper end edge portion 9 crimped down against the upper shoulder portion 26 of the cap member 8. In this fourth embodiment, no plastic seal 21 is provided, in contradistinction to the other previously described embodiments.

Figure 6:
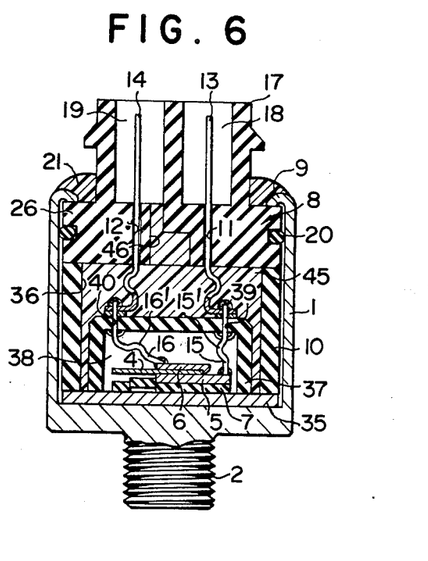
FIG. 6 is a part sectional view, similar to FIGS. 1, 3, 4, and 5, taken along the longitudinal axis of a sensor which is a fifth embodiment of the present invention, this fifth embodiment being broadly similar to the third embodiment shown in FIG. 4, except that an intermediate chamber formed around a sensor element side protective member and a sensor element top end protective member, which are formed integrally together, is filled with a plastic material.

In FIG. 6, a fifth embodiment of the sensor according to the present invention is shown, in a view similar to FIGS. 1, 3, 4, and 5. In this figure, parts which correspond to parts in the other embodiments are designated by the same reference numerals as in the figures showing those other embodiments. This fifth embodiment is a modification of the third embodiment shown in FIG. 4. In this embodiment, the middle protective chamber 36 is filled with a plastic material, denoted by 45. In order to fill this plastic material 45 into the middle protective chamber 36, after the sensor has been assembled, a filling aperture 46 is provided through the end closing cap member 8. Thus, the plastic material 45 can be injected through this filling aperture 46, as a final step in the production of the sensor.

In this embodiment, the other constructional details are broadly similar to those of the third embodiment shown in FIG. 4, except that the ring shaped bracing member 10 is formed as a separate member from the end closing cap member 8, as in the fourth embodiment shown in FIG. 5, and also the electrical connector elements 13 and 14, between their portions which are attached to the upper side of the inner sensor protective cover 37 and their portions which pass through the connector holes 11 and 12 in the cap member 8, are formed with sinuous portions, so as further to absorb any force exerted on the upper exposed ends of the electrical connector elements 13 and 14, and ensure that the integrity of the sensor element inner protective chamber 38 is not breached thereby, so as adversely to affect the sensor element 4.

Figure 7:
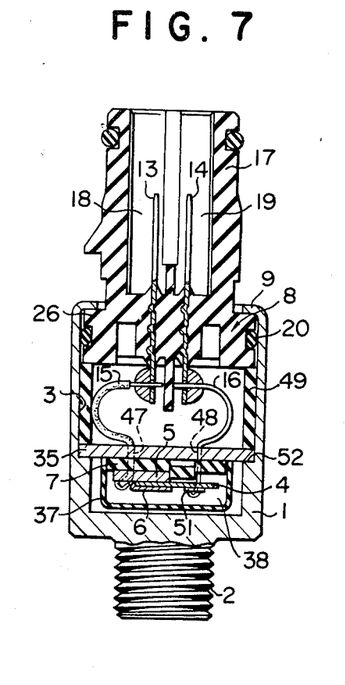
FIG. 7 is a part sectional view, similar to FIGS. 1, 3, 4, 5, and 6, taken along the longitudinal axis of a sensor which is a sixth embodiment of the present invention, in which the sensor element side protective member and a sensor element base end protective member are formed integrally, and the aforesaid sensor element top end protective member is formed separately therefrom, and is mounted, at an axially intermediate point, within the sensor outer hollow tubular casing.

In FIG. 7 there is shown a sixth embodiment of the sensor according to the present invention, in an axial longitudinal part sectional view similar to the views showing the other five embodiments. In this figure, parts which correspond to parts in the other embodiments are designated by the same reference numerals as in the figures showing those other embodiments. This embodiment of the present invention is constructed somewhat differently from the previous embodiments. In this embodiment, a metallic sensor base mounting plate 35 is provided for mounting the 7 thereon, as in the embodiments of FIGS. 4, 5, and 6, but this metallic sensor base mounting plate 35 is not closely abutted to the closed end of the outer hollow tubular sensor casing 1, on the other side of which is provided the screwed attachment protuberance 2, as in these previous embodiments, but, instead, is mounted across the internal cylindrical space within the tubular sensor casing 1 at an intermediate axial portion therein. Corresponding to this, the inner sensor protective cover 37 defining the sensor element inner protective chamber 38 therein is not provided on the side of the metallic plate 35 most remote from the screwed attachment protuberance 2, but, on the contrary, is provided on the other side of the metallic plate 35 nearer to the screwed attachment protuberance 2. According to such a construction, the connecting lead wires 15 and 16 may be led out from the sensor element inner protective chamber 38 to be connected to the electrical connector elements 13 and 14, respectively, without requiring to cross the internal space within the sensor element inner protective chamber 38, and, accordingly, they run no risk of interfering with the operation of the sensor element inner protective chamber 38, even during a long period of use of the sensor. This inventive concept is disclosed and claimed in copending U.S. patent application Ser. No. 162,499 filed June 24, 1980, which has been filed by the same applicant, and has been assigned to the same assignee, as the present application. The metallic sensor base mounting plate 35 is therefore abutted against a cylindrical step 52 formed on the inner cylindrical surface of the tubular sensor casing 1 at an axially intermediate portion thereof, and is clamped to this cylindrical step 52 by a hollow cylindrical slotted bracing ring 49, which corresponds in function to the ring shaped bracing member 10 of the embodiments of FIGS. 5 and 6. The upper end of the hollow cylindrical slotted bracing ring 49 in the drawing is abutted against the lower end of the cap member 8, and the lower end of the hollow cylindrical slotted bracing ring 49 is abutted against the upper side of the metallic sensor base mounting plate 35. The cap member 8 is fixed within the tubular sensor casing 1, as in the previous embodiments, by the open upper end edge portion 9 being crimped down against the upper shoulder portion 26 of the cap member 8.

Figure 8:
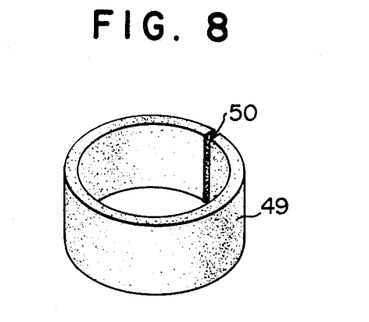
FIG. 8 is a perspective view of a hollow cylindrical axially slotted bracing ring, used in the construction of the sixth embodiment of the sensor of the present invention shown in FIG. 7.

In this embodiment, the electrical connector elements 13 and 14 are solidly fixed to the cap member 8 by their intermediate sinuous portions being closely coacted to the interior surfaces of holes provided in the cap member 8, by insert moulding or the like. Therefore, the electrical connector elements 13 and 14 are attached to the cap member 8 in the process of forming the cap member 8, and, accordingly, the process of assembly of this embodiment is somewhat different from the process of assembly of the other previously described embodiments, because the electrical connector elements 13 and 14 cannot be inserted into their holes in the connector protective cavities 18 and 19 at a late stage in the assembly procedure. Corresponding to this, therefore, the hollow cylindrical slotted bracing ring 49 is not formed as a continuous ring member, as was the case with the ring shaped bracing member 10 in the FIGS. 5 and 6 embodiments, but, on the contrary, is formed with an axially extending slot 50 therein, as shown in a perspective view in FIG. 8. This is because it is convenient to attach the lower ends of the connecting lead wires 15 and 16 to the plates 5 and 6, respectively, at an early stage in the assembly of the sensor, and, since the diameter of the metallic plate 35 is greater than the internal diameter of the hollow cylindrical slotted bracing ring 49, if the ring 49 were continuous, it would be impossible conveniently to attach the upper ends of the connecting lead wires 15 and 16 to the lower ends of the electrical connector elements 13 and 14.

Therefore, before the ring 49 is approached to the assembly, the upper ends of the connecting lead wires 15 and 16 are soldered to the lower ends of the electrical connector elements 13 and 14, respectively, and then, with the assembly comprising the metallic sensor base mounting plate 35, the inner sensor protective cover 37, the sensor element 4, etc., pulled in the direction away from the electrical connector element 13 and 14 and the cap member 8, so as to straighten the intermediate portions of the connecting lead wires 15 and 16, then the ring 49 is approached to this assembly and the intermediate portions of the connecting lead wires 15 and 16 are passed through the axially extending slot 50 of the ring 49, so that the ring 49 is located around these intermediate portions. Then the plate 35 is approached to the lower surface of the cap member 8, so as to provide a certain amount of free play or slack in the connecting lead wires 15 and 16, the function of this free play or slack corresponding to the function of the kinked portions 15' and 16' in the above described second, third, and fourth embodiments. Then the cap member 8 is inserted into the upper open end of the tubular sensor casing 1, and the open upper end edge portion 9 is crimped down against the upper shoulder portion 26, so as to hold the cap member 8 firmly in the tubular sensor casing 1, as in the other previously described embodiments.

Again in this embodiment, because the sensor element 4 is enclosed within a substantially closed sensor element protective chamber, i.e. the sensor element inner protective chamber 38, which is defined by a sensor element side protective member, constituted by the side of the inner sensor protective cover 37, and a sensor element end protective member, which is constituted by the end surface of the cover 37, thereby the sensor element 4 is positively assured of protection against ingress of dirt, oil, moisture, dust, or the like, even during a long period of operation thereof, and thus the durability of the sensor according to the above described sixth embodiment of the present invention is enhanced.

Figure 9:
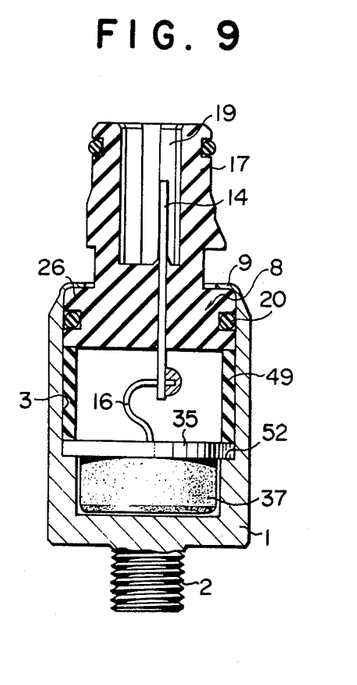
FIG. 9 is a part sectional view, generally similar to FIGS. 1, 3, 4, 5, 6 and 7, except that it does not show a sectional view of the sensor element and the protective chamber thereof, taken along the longitudinal axis of a sensor which is a seventh embodiment of the present invention, which is broadly similar to the sixth embodiment shown in FIG. 7, except that only one such electrically conducting sensor lead structure is provided for leading electrical output signals from the sensor element, the other terminal of the sensor element being grounded to the casing of the sensor.

In FIG. 9, a seventh embodiment of the sensor according to the present invention is shown in a part section along its longitudinal axis. In this figure, parts which correspond to parts in the other embodiments are designated by the same reference numerals as in the figures showing those other embodiments. This embodiment is very similar to the sixth embodiment shown in FIG. 7, except that only one electrical connector element 14 is provided, and only one connecting lead wire 16 is provided, the upper end of which is connected to the lower end of the electrical connector element 14 by soldering or the like, and the lower end of which passes through a hole in the metallic sensor base mounting plate 35 to be connected to the second electrically conducting contact plate 6. Corresponding to this, the first electrically conducting contact plate 5 is connected directly to the metallic sensor base mounting plate 35, and is thereby grounded so that the electrical signals provided by the sensor are provided between the ground, i.e., the metallic sensor base mounting plate 35 and the outer hollow tubular sensor casing 1 of the sensor, and the electrical connector element 14. The other functions, and the construction, of this embodiment are the same as those of the sixth embodiment shown in FIG. 7, and, accordingly, detailed description thereof will be omitted for the sake of brevity of explanation.

Therefore, it is seen that according to the present invention, a sensor is provided in which the sensor element is enclosed within a substantially closed inner sensor element protective chamber. Accordingly, the working life of such a sensor is effectively prolonged, and the reliability thereof is increased. Further, this construction has been made possible without great increase in the manufacturing cost of the sensor, or great increase in its size. Therefore, although the present invention has been shown and described in terms of some preferred embodiments thereof, and in language more or less specific with regard to structural features thereof, and with reference to the illustrative drawings, it should be understood that in any particular embodiment of the present invention various changes, modifications, and omissions of the form and the detail thereof can be made by a person skilled in the art, without departing from the essential scope of the invention. Therefore, it is expressly desired that the scope of the present invention should be uniquely delimited by the legitimate and valid scope of the appended claims, which follow, and not by any of the perhaps purely fortuitous details of the shown embodiments, or of the drawings.

I claim:

1. A sensor for sensing a condition of a body, comprising:
   an outer hollow tubular sensor casing, a first end of which is open and a second end of which is closed and is provided on its outside side with a protuberance adapted for connection to the body;
   an end closing member which closes the first open end of the outer hollow tubular sensor casing, and is fixedly mounted thereto;
   a sensor element for producing an electrical output signal, mounted within the outer hollow tubular sensor casing;
   a sensor element side protective member, passing all around the sensor element between it and the inner wall of the outer hollow tubular sensor casing;
   a sensor element base end protective member, between the sensor element and the second closed end of the outer hollow tubular sensor casing;
   a sensor element other end protective member defining an end of the substantially closed sensor element protective chamber remote from the second closed end of the outer hollow tubular sensor casing;
   the sensor element side protective member, the sensor element base end protective member, and the sensor element other end protective member are formed as separate members, and are all clamped together between the end of the end closing member closest to said second closed end of the outer hollow tubular sensor casing, and the inside side of the second closed end of the outer hollow tubular sensor casing, the side of the end closing member closest to the second closed end abutting the side of the sensor element other end protective member remote from the second closed end, the side of the sensor element other end protective member closest to the second closed end abutting the end of the sensor element side protective member remote from the second closed end, the end of the sensor element side protective member closest to the second closed end abutting the side of the sensor element base end protective member remote from the second closed end, and the side of the sensor element base end protective member closest to the second closed end abutting the inside surface of the second closed end; and
   an electrically conducting sensor lead structure, connected at its one end to the sensor element for receiving a sensor output electrical signal therefrom, and passing through an aperture in the end closing member to the outside of the sensor.

2. A sensor according to claim 1, wherein the side of the substantially closed sensor element protective chamber remote from the second closed end of the outer hollow tubular sensor casing is defined by the end closing member.

3. A sensor according to claim 2, wherein the sensor element side protective member is formed integrally with the end closing member.

4. A sensor according to claim 3, wherein the sensor element base end protective member is clamped between the end of the sensor element side protective member remote from the first open end, and the inside side of the second closed end.

5. A sensor according to claim 1, wherein the sensor element other end protective member and the sensor element side protective member are integrally formed as a cup shaped member with its opening facing in the direction of the second closed end of the outer hollow tubular sensor casing, while the sensor element base end protective member is formed separately from the cup shaped member, with the side of the sensor element base end protective member remote from the second closed end abutting the edge of the cup shaped element on its side closest to the second closed end, while the side of the sensor element base end protective member closest to the second closed end abuts the inner surface of the second closed end, the sensor element base end protective member extending laterally beyond the outside of the sensor element side protective member to provide a shelf.

6. A sensor according to claim 5, further comprising a ring shaped member, surrounding the sensor element side protective member, the end of the ring shaped member closest to the second closed end of the outer hollow tubular sensor casing abutting against the side of the shelf remote from the second closed end and clamping the sensor element base end protective member against the inner surface of the second closed end.

7. A sensor according to claim 6, wherein the ring shaped member is integral with the end closing member.

8. A sensor according to claim 6, wherein the ring shaped member is separate from the end closing member, and the end of the ring shape member remote from the second closed end of the outer hollow tubular sensor casing abuts the side of the end closing member closest to the second closed end.

9. A sensor according to claim 7 or claim 8, wherein the electrically conducting sensor lead structure comprises a connector element, whose end remote from the second closed end of the outer hollow tubular sensor casing projects outside from the end closing member, and whose end closest to the second closed end of the outer hollow tubular sensor casing is mounted to the sensor element other end protective member on its side remote from the second closed end.

10. A sensor according to claim 9, wherein the space between the cup shaped element, the sensor element base end protective member, the ring shaped member, and the end closing member is filled with plastic material.

11. A sensor according to claim 9, wherein the part of the connector element between the sensor element other end protective member and the end closing member is sinuous.

12. A sensor according to claim 7 or claim 8, wherein the electrically conducting sensor lead structure comprises a connector element and a clip, the clip being mounted to the side of the sensor element other end protective member remote from the second closed end of the outer hollow tubular sensor casing, the end of the connector element remote from the second closed end projecting outside from the end closing member, while the end of the connector element closest to the second closed end is engaged with the clip.

13. A sensor according to claim 12, wherein the space between the cup shaped element, the sensor element base end protective member, the ring shaped member, and the end closing member is filled with plastic material.

14. A sensor for sensing a condition of a body, comprising:
an outer hollow tubular sensor casing, a first end of which is open and a second end of which is closed and is provided on its outside side with a protuberance adapted for connection to the body;
an end closing member which closes the first open end of the outer hollow tubular sensor casing, and is fixedly mounted thereto;
a sensor element for producing an electrical output signal, mounted within the outer hollow tubular sensor casing;
a sensor element side protective member, passing all around the sensor element between it and the inner wall of the outer hollow tubular sensor casing;
a sensor element base end protective member, between the sensor element and the second closed end of the outer hollow tubular sensor casing;
the sensor element side protective member and the sensor element base end protective member being coupled together so as to form an assembly receiving the sensor element in a substantially closed chamber; and
an electrically conducting sensor lead structure, connected at its one end to the sensor element for receiving a sensor output electrical signal therefrom, and passing through an aperture in the end closing member to the outside of the sensor;
the sensor element base end protective member and said sensor element side protective member are integrally formed as a cup-shaped member with its opening facing in the direction away from the second closed end of the outer hollow tubular sensor casing, and further comprising a sensor element other end protective member mounted at an intermediate axial position within the hollow space within the outer hollow tubular sensor casing, the cup-shaped element being attached to the side of the sensor element other end protective member closest to the second open end and the electrically conducting sensor lead structure passing through a hole formed in the sensor element other end protective member.

15. A sensor according to claim 14, further comprising a hollow cylindrical axially slotted bracing ring, which is mounted within the outer hollow tubular sensing casing, and whose outer cylindrical face cooperates closely with an inner cylindrical face of the outer hollow tubular sensor casing, the axial end of the hollow cylindrical slotted bracing ring more remote from the second closed end closely abutting the side of the end closing member closest to the second closed end, and the end of the hollow cylindrical slotted bracing ring closer to the closed second end closely abutting the side of the sensor element other end protective member remote from the second closed end, while the side of the sensor element other end protective member closest to the second closed end abuts a step formed in the inner cylindrical surface of the outer hollow tubular sensor casing.

16. A sensor for sensing vibration of a body, comprising:
an outer hollow tubular sensor casing, a first end of which is open and a second end of which is closed and is provided with a protuberance for screw connection to the body;
an inner casing assembly inserted into said outer hollow tubular sensor casing through said open end, comprising a substantially air-tight container structure completely housed in a hollow space of said outer hollow tubular sensor casing, a cover plate portion spaced from said container structure so as to provide an intermediate space therebetween and closing said open end of said outer hollow tubular sensor casing, and a connector protecting shell portion extending outwardly from said cover plate portion through said open end of said outer hollow tubular sensor casing and providing a cavity space;

a vibration sensor element for producing an electrical signal, mounted within said container structure;

an electrically conducting lead wire having an inner end portion connected to said vibration sensor element for receiving a sensor output electrical signal therefrom and an outer end portion passing substantially air-tightly through a wall portion of said container structure to the outside thereof; and, an electrical connector element extending through said cover plate portion towards said cavity space provided by said connector protecting shell portion and connected at a root end portion thereof located on the side of said cover plate portion remote from said connector protecting shell portion and located in said intermediate space with said outer end portion of said lead wire.

17. A sensor according to claim 16, wherein said container structure comprises a bottom plate element positioned in contact with said closed end of said outer hollow tubular sensor casing, a top plate element spaced from and confronting said bottom plate element, and a tubular side element positioned between said bottom plate element and said top plate element, said bottom, top and side elements being assembled as said substantially air-tight container structure when said inner casing assembly has been mounted to said outer hollow tubular sensor casing.

18. A sensor according to claim 16, wherein said container structure comprises a cup-shaped element and a plate element which closes an open end of said cup-shaped element.

19. A sensor according to claim 16, wherein said root end portion of said electrical connector element is mechanically fixed to said container structure together with said outer end portion of said lead wire.

20. A sensor according to claim 16, wherein said inner casing assembly is totally firmly assembled to said outer hollow tubular sensor casing by an edge portion of said open end of said outer hollow tubular sensor casing being clamped over said cover plate portion of said inner casing assembly.

* * * * *